US011922802B2

(12) United States Patent
Lorenz et al.

(10) Patent No.: US 11,922,802 B2
(45) Date of Patent: Mar. 5, 2024

(54) METHODS AND SYSTEMS FOR GENERATING TRAFFIC VOLUME OR TRAFFIC DENSITY DATA

(71) Applicant: TomTom Traffic B.V., Amsterdam (NL)

(72) Inventors: Christian Lorenz, Berlin (DE); Sören Sonnenburg, Berlin (DE); Robin Tenhagen, Berlin (DE); Arne Kesting, Berlin (DE); Vinh Tho Ma, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 153 days.

(21) Appl. No.: 16/968,852

(22) PCT Filed: Feb. 8, 2019

(86) PCT No.: PCT/EP2019/053114
§ 371 (c)(1),
(2) Date: Aug. 10, 2020

(87) PCT Pub. No.: WO2019/158438
PCT Pub. Date: Aug. 22, 2019

(65) Prior Publication Data

US 2021/0020034 A1 Jan. 21, 2021

(30) Foreign Application Priority Data

Feb. 14, 2018 (GB) ...................................... 1802366

(51) Int. Cl.
*G08G 1/01* (2006.01)

(52) U.S. Cl.
CPC .................................. *G08G 1/0133* (2013.01)

(58) Field of Classification Search
CPC ... G08G 1/0133; G08G 1/0141; G08G 1/0112
See application file for complete search history.

(56) References Cited

U.S. PATENT DOCUMENTS 9,240,123 B2 * 1/2016 Stenneth .............. G08G 1/0112
10,553,110 B2 * 2/2020 Fowe ..................... G08G 1/052
(Continued)

FOREIGN PATENT DOCUMENTS

CN 101438335 A 5/2009

OTHER PUBLICATIONS

Search Report for International Application No. PCT/EP2019/053114 dated May 13, 2019.

*Primary Examiner* — Steven Lim
*Assistant Examiner* — Son M Tang
(74) *Attorney, Agent, or Firm* — Park, Vaughan, Fleming & Dowler LLP

(57) ABSTRACT

There is provided a method for generating traffic data indicative of a traffic volume and/or traffic density within a navigable network in an area covered by an electronic map, the electronic map comprising a plurality of segments representing navigable elements of the navigable network. The method generally comprises obtaining positional data relating to the movement of a plurality of devices along the navigable elements represented by the segments of the electronic map; determining, using (at least) positional data relating to one or more congested segments within a region of the navigable network, an estimate of one or more average penetration rates for the region; determining a sample volume for a non-congested segment within the region based on the obtained positional data; and estimating, using the determined sample volume and a selected one of the average penetration rates for the region, a traffic volume and/or traffic density for the non-congested segment. Also provided are systems for performing the method. Accordingly, traffic volume and/or traffic densities can be estimated from probe data.

20 Claims, 3 Drawing Sheets

(56) References Cited

U.S. PATENT DOCUMENTS

| | | | | |
|---|---|---|---|---|
| 10,750,374 | B1 * | 8/2020 | Keshavamurthy | G08G 1/0112 |
| 10,859,392 | B2 * | 12/2020 | Herlocker | G08G 1/0133 |
| 10,991,242 | B2 * | 4/2021 | Taylor | H04Q 9/00 |
| 11,282,379 | B2 * | 3/2022 | Mulcahy | G08G 1/0129 |
| 2006/0226968 | A1 * | 10/2006 | Tengler | G08G 1/096741 340/466 |
| 2007/0208501 | A1 * | 9/2007 | Downs | B60T 7/18 701/79 |
| 2008/0071465 | A1 * | 3/2008 | Chapman | G08G 1/0104 701/117 |
| 2011/0029224 | A1 | 3/2011 | Chapman et al. | |
| 2011/0248867 | A1 * | 10/2011 | Lee | G08G 1/0104 340/905 |
| 2012/0123658 | A1 * | 5/2012 | Kagawa | G08G 1/164 701/93 |
| 2012/0123659 | A1 * | 5/2012 | Sato | G08G 1/163 701/96 |
| 2012/0123660 | A1 * | 5/2012 | Kagawa | G08G 1/0112 701/96 |
| 2012/0173530 | A1 * | 7/2012 | Kurciska | G06F 16/29 707/738 |
| 2013/0132434 | A1 * | 5/2013 | Scofield | G08G 1/0112 707/E17.014 |
| 2013/0275033 | A1 * | 10/2013 | Bastiaensen | G01C 21/26 701/119 |
| 2013/0282264 | A1 * | 10/2013 | Bastiaensen | G08G 1/0145 701/119 |
| 2014/0358414 | A1 * | 12/2014 | Ibrahim | G08G 1/0129 701/119 |
| 2015/0120174 | A1 | 4/2015 | Lewis | |
| 2015/0170514 | A1 * | 6/2015 | Stenneth | G08G 1/0125 701/117 |
| 2015/0262477 | A1 * | 9/2015 | Fowe | G08G 1/096716 701/118 |
| 2015/0312327 | A1 * | 10/2015 | Fowe | G08G 1/096716 701/426 |
| 2016/0104376 | A1 * | 4/2016 | Fowe | G08G 1/0141 701/119 |
| 2016/0364739 | A1 * | 12/2016 | Dann | G06Q 50/10 |
| 2016/0379489 | A1 * | 12/2016 | MacFarlane | G08G 1/0133 701/119 |
| 2017/0004707 | A1 * | 1/2017 | Fowe | G01C 21/3658 |
| 2017/0061787 | A1 * | 3/2017 | Lorkowski | G08G 1/0141 |
| 2017/0076594 | A1 * | 3/2017 | Scofield | A61B 5/369 |
| 2017/0309171 | A1 | 10/2017 | Zhao et al. | |
| 2018/0249066 | A1 * | 8/2018 | Katsumata | G06V 20/584 |
| 2018/0374346 | A1 * | 12/2018 | Fowe | G08G 1/0112 |
| 2020/0317200 | A1 * | 10/2020 | Elgie | G08G 1/096741 |

* cited by examiner

Step 201 – Determine average speed for congested segment using probe data from a plurality of vehicles travelling along segment Step 202 – Determine the traffic volume for the congested segment from the average speed using macroscopic traffic model Step 203 – Determine the penetration rate for the congested segment as the ratio of sample probe count to traffic flow

FIGURE 2

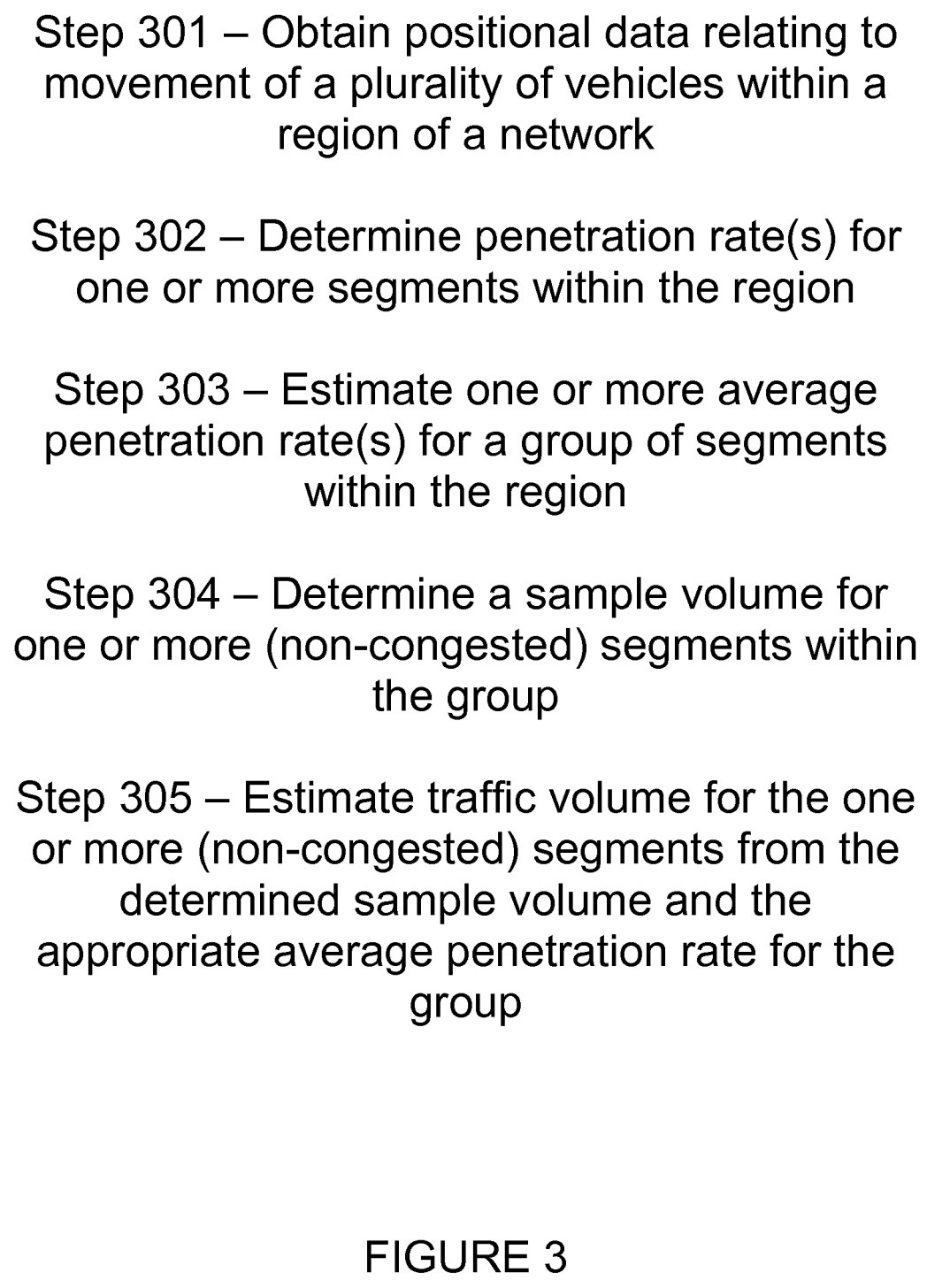

Step 301 – Obtain positional data relating to movement of a plurality of vehicles within a region of a network Step 302 – Determine penetration rate(s) for one or more segments within the region Step 303 – Estimate one or more average penetration rate(s) for a group of segments within the region Step 304 – Determine a sample volume for one or more (non-congested) segments within the group Step 305 – Estimate traffic volume for the one or more (non-congested) segments from the determined sample volume and the appropriate average penetration rate for the group

FIGURE 3

METHODS AND SYSTEMS FOR GENERATING TRAFFIC VOLUME OR TRAFFIC DENSITY DATA

CROSS-REFERENCE TO RELATED APPLICATIONS

The present application is a National Stage of International Application No. PCT/EP2019/053114, filed on Feb. 8, 2019, and designating the United States, which claims benefit to United Kingdom Patent Application 1802366.3 filed on Feb. 14, 2018. The entire content of these applications is incorporated herein by reference.

FIELD OF THE INVENTION

The present invention relates to methods and systems for generating traffic data indicative of traffic volume and/or traffic density within a navigable network. The navigable network is in an area covered by an electronic map, the electronic map comprising a plurality of segments representing navigable elements of the navigable network.

BACKGROUND TO THE INVENTION

Traffic volume (also referred to as traffic 'flow') is a measure of the number of vehicles passing through a given cross section of a roadway in a specified period of time. Similarly, traffic density is a measure of the number of vehicles per length interval. The traffic volume and density are both important quantities for characterising the state of the traffic within a road network. Having knowledge of such traffic data may thus be highly beneficial for traffic management and control purposes.

For instance, along with traffic speed, the traffic volume is a key parameter for many traffic management and control applications. In general, traffic volume data may be used for various applications to give more complete operational performance measures. For example, traffic volume data can provide insight into the real-time flow through the network that may be useful for monitoring major events or incidents occurring within the network, including monitoring the impact of traveller information on diversion routes (which are typically not equipped with traffic monitoring systems). As another example, traffic volume data may be used for determining traffic demand patterns e.g. for calibration and validation of traffic light signal patterns. The traffic volume data can also be used for estimating road capacities e.g. for use in traffic planning models. As yet another example, combining the traffic volume data with data reporting the delay (or costs) caused by traffic congestion may allow the costs of transportation to be estimated.

Traffic density is another important quantity for characterising the state of traffic. For instance, whereas the traffic volume represents the flow of vehicles, the traffic density represents a spatial snapshot of the traffic state. It will be appreciated that including traffic densities alongside traffic speeds may therefore provide additional insight for users. For instance, traffic density data may complement average speed or delay data by indicating how dense the traffic situation actually is and thus provide a more complete representation of the traffic conditions within the network. For example, even for the same traffic speed, traffic conditions may vary between e.g. an empty road at night or moderate traffic during the day. Thus, knowledge of the traffic density may help indicate, in a manner that reflects the road users' experience, whether a reduced speed is due to congestion (i.e. dense traffic) or due to some other external factors (e.g. fog, snow on the road, low light, etc.).

Within a given road network, a certain number of vehicles (or "probes") may be equipped with position detecting means (such as a GPS device) and may therefore provide probe data (e.g. GPS data) relating to their movement throughout the network. It is difficult to measure traffic volumes (and densities) from such probe data as typically only a fraction of the total vehicle fleet is reporting data. Currently, the percentage of vehicles for which data is collected (i.e. the 'penetration rate') is only of the order of about 10%, and even less in some areas. This may generally be sufficient for generating estimates of traffic speed (which may be supplemented where necessary using historical data). However, the low penetration rate and potentially uneven sampling rate means that traffic volumes (and densities) normally are not (and cannot be) determined directly from probe data. One method for estimating traffic volumes using probe data is described in US 2015/0120174 A1 (HERE GLOBAL B.V.). However, the method described in US 2015/0120174 A1 is still seen to suffer from various drawbacks.

Accordingly, traffic volumes (and densities) are traditionally measured by directly counting the number of vehicles at a certain location within the road network, using either manual or automatic counting methods. Manual counting typically involves a group of people simply recording the number of vehicles passing a predetermined location, e.g. using tally marks in inventories. Automatic counting may be performed by employing various sensors at desired locations within the road network. For instance, it is known to use video or radar sensors to automatically count vehicles passing through a given cross section of a roadway, although the most widely used technique for automatic counting relies on inductive sensing (e.g. wherein inductive loop sensors are embedded into the road network). These types of sensors may be expensive to install and maintain and their availability varies widely from location to location. Such direct counting methods may thus provide accurate data but can't easily be scaled to offer wider coverage of a road network.

Accordingly, the Applicant has realised that there remains a need for improved methods and systems for providing traffic volume and density data in respect of a navigable network.

SUMMARY OF THE INVENTION

In accordance with a first aspect of the present invention there is provided a method for generating traffic data indicative of a traffic volume and/or traffic density within a navigable network in an area covered by an electronic map, the electronic map comprising a plurality of segments representing navigable elements of the navigable network, the method comprising:

- obtaining positional data relating to the movement of a plurality of devices along the navigable elements represented by the segments of the electronic map;
- determining, using at least positional data relating to one or more congested segments within a region of the navigable network, an estimate of one or more average penetration rate(s) for the region;
- determining, based on the obtained positional data, a sample volume for a non-congested segment within the region; and estimating, using the determined sample volume and a selected one of the average penetration rate(s) for the region, a traffic volume and/or traffic density for the non-congested segment.

Thus, in accordance with embodiments of the present invention, traffic volume and/or traffic density data can be estimated using positional data relating to the movement of a plurality of devices along the navigable elements represented by the segments of the electronic map, i.e. using probe data. Particularly, positional data associated with devices travelling along one or more congested segments (and optionally also detector data from any segments where the traffic volume or density, and hence penetration rate, can be directly measured) within a region of the navigable network can be used to determine an estimate of one or more average penetration rates for the region. For instance, for a congested segment, where vehicles can generally be assumed to be constrained to travel at a substantially constant collective speed (e.g. in a traffic jam situation), it is possible using the techniques presented herein to determine the traffic volume or density, and hence estimate a penetration rate, for the segment from positional data relating to vehicles moving along that segment. It is not generally possible to determine the traffic volume or density for other, non-congested segments from positional data for those segments alone. However, according to embodiments of the present invention, by determining one or more average penetration rates for the region, e.g. describing the varying level of penetration as a function of location within the region (and optionally also as a function of other factors such as road class and/or over time), which can then be used to project sample observations for any given segment within the region to total traffic volumes or densities, an inference of the traffic volume and/or traffic density for such non-congested segments can be made. For instance, the penetration rate may generally vary as a function of location within the navigable network and also potentially as a function of time. Accordingly, by selecting the (most) appropriate average penetration rate for any particular segment, e.g. the average penetration rate that provides the best possible accuracy with respect to the location of the segment (optionally along with any other factors and/or the current time), the sample volume for that segment can be extrapolated to estimate the total traffic volume and/or traffic density.

Accordingly, the present invention provides methods for determining traffic volume and/or density data that are seen to overcome various problems with existing techniques. For instance, according to the present invention, traffic volume and/or traffic density data can be estimated from probe data. Because probe data is generally a pervasive data source, so that positional data can be obtained throughout the network (at least so long as there are sufficient devices within the network), compared to traditional direct sensing methods the present invention may allow a relatively wider spatial coverage at relatively lower cost and e.g. without having to install and maintain a large number of sensors (or deploy observers) throughout the network. Furthermore, the use of probe data offers a potentially large statistical base for determining the average penetration rates for the region, and in turn for estimating the traffic volumes and/or traffic densities, while also allowing an indication of the statistical error to be provided. By contrast, with traditional direct sensing methods it can be difficult to identify wrong detector data and wrongly map-matched detector locations.

It is also believed that the present approach can provide more accurate and reliable traffic data than the methods described in US 2015/0120174 A1. For instance, in US 2015/0120174 A1, non-congested segments are processed entirely separately to congested segments using either a congested algorithm or a free-flow algorithm, wherein in the free-flow algorithm the traffic on non-congested segments is simply assumed to follow historic patterns, which may not accurately reflect the current conditions.

The present invention also extends to a system for carrying out a method in accordance with any of the embodiments of the invention described herein. Thus, in accordance with a second aspect of the invention there is provided a system for generating traffic volume and/or traffic density data indicative of a traffic volume and/or traffic density within a navigable network in an area covered by an electronic map, the electronic map comprising a plurality of segments representing navigable elements of the navigable network, the system comprising processing circuitry configured to:

obtain positional data relating to the movement of a plurality of devices along the navigable elements represented by the segments of the electronic map;

determine, using at least positional data relating to one or more congested segments within a region of the navigable network, an estimate of one or more average penetration rate(s) for the region;

determine, based on the obtained positional data, a sample volume for a non-congested segment within the region; and estimate, using the determined sample volume and a selected one of the average penetration rate(s) for the region, a traffic volume and/or traffic density for the non-congested segment.

The present invention in the second aspect may include any or all of the features described in relation to the first aspect of the invention, and vice versa, to the extent that they are not mutually inconsistent. Thus, even if not explicitly stated herein, the system of the present invention may comprise means or circuitry for carrying out any of the steps of the method or invention as described herein.

The various functions described herein can be carried out in any desired and suitable manner. For example, the present invention can generally be implemented in hardware or software, as desired. Thus, for example, unless otherwise indicated, the various functional elements, stages, units, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

The means (processing circuitry) for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing, for example, the generated traffic volume and/or traffic density data. The system may further comprise display means, such as a computer display, for displaying, for example, the generated traffic volume and/or traffic density data.

The methods of the present invention are, in preferred embodiments, implemented by a server. Thus, in embodiments, the system of the present invention comprises a server comprising means (processing circuitry) for carrying out the various steps described, and the method steps described herein are carried out by a server.

The navigable network may comprise a road network, wherein each navigable element represents a road or a portion of a road. For example, a navigable element can represent a road between two adjacent intersections of the road network, or a navigable element may represent a portion of a road between two adjacent intersections of the road network. As will be appreciated, however, the navigable network is not limited to a road network, and may comprise, for example, a network of foot paths, cycle paths, rivers, etc. It should be noted that the term "segment" as used herein takes its usual meaning in the art. A segment of an electronic map is a navigable link that connects two points or nodes. While embodiments of the present invention are described with particular reference to road segments, it should be realised that the invention may also be applicable to other navigable segments, such as segments of a path, river, canal, cycle path, tow path, railway line, or the like. Thus, any reference to a "road segment" may be replaced by a reference to a "navigable segment" or any specific type or types of such segments.

The network is represented by electronic map data. The electronic map data may be stored by or otherwise accessible by the server, in embodiments in which the method is implemented using a server. The electronic map (or mathematical graph, as it is sometimes known), in its simplest form, is effectively a database containing data representative of nodes, most commonly representative of road intersections, and lines between those nodes representing the roads between those intersections. In more detailed digital maps, lines may be divided into segments defined by a start node and end node. These nodes may be "real" in that they represent a road intersection at which a minimum of three lines or segments intersect, or they may be "artificial" in that they are provided as anchors for segments not being defined at one or both ends by a real node to provide, among other things, shape information for a particular stretch of road or a means of identifying the position along a road at which some characteristic of that road changes, e.g. a speed limit. In practically all modern digital maps, nodes and segments are further defined by various attributes which are again represented by data in the database. For example, each node will typically have geographical coordinates to define its real-world position, e.g. latitude and longitude. Nodes will also typically have manoeuvre data associated therewith, which indicate whether it is possible, at an intersection, to move from one road to another; while the segments will also have associated attributes such as the maximum speed permitted, the lane size, number of lanes, whether there is a divider in-between, etc.

The invention comprises a step of obtaining positional data relating to the movement of a plurality of devices with respect to time along navigable elements of the navigable network as represented by the electronic map data. The positional data used in accordance with the invention is positional data relating to the movement of a plurality of devices along the or each navigable element with respect to time. The method may comprise obtaining positional data relating to the movement of a plurality of devices with respect to time in the navigable network, and filtering the positional data to obtain positional data relating to the movement of a plurality of devices along the or each given navigable element with respect to time. The step of obtaining the positional data relating to the movement of devices along the or each navigable element may be carried out by reference to the electronic map data indicative of the navigable network. The method may involve the step of matching positional data relating to the movement of devices in a geographic region including the navigable network to at least the or each navigable element being considered in accordance with the invention.

In some arrangements the step of obtaining the positional data may comprise accessing the data, i.e. the data being previously received and stored. However, preferably, the method may comprise receiving the positional data from the devices. In embodiments in which the step of obtaining the data involves receiving the data from the devices, it is envisaged that the method may further comprise storing the received positional data before proceeding to carry out the other steps of the present invention, and optionally filtering the data. The step of receiving the positional data need not take place at the same time or place as the other step or steps of the method.

The positional data used in accordance with the invention is collected from one or more, and preferably multiple devices, and relates to the movement of the devices with respect to time. Thus, the devices are mobile devices. It will be appreciated that at least some of the positional data is associated with temporal data, e.g. a timestamp. For the purposes of the present invention, however, it is not necessary that all positional data is associated with temporal data, provided that it may be used to provide the information relating to the movement of devices along a navigable segment in accordance with the present invention. However, in preferred embodiments all positional data is associated with temporal data, e.g. a timestamp.

The positional data relates to the movement of the devices with respect to time, and may be used to provide a positional "trace" of the path taken by the device. As mentioned above, the data may be received from the device(s) or may first be stored. The devices may be any mobile devices that are capable of providing the positional data and sufficient associated timing data for the purposes of the present invention. The device may be any device having position determining capability. For example, the device may comprise means for accessing and receiving information from WiFi access points or cellular communication networks, such as a GSM device, and using this information to determine its location. In preferred embodiments, however, the device comprises a global navigation satellite systems (GNSS) receiver, such as a GPS receiver, for receiving satellite signals indication the position of the receiver at a particular point in time, and which preferably receives updated position information at regular intervals. Such devices may include navigation devices, mobile telecommunications devices with positioning capability, position sensors, etc.

Preferably the device is associated with a vehicle. In these embodiments the position of the device will correspond to the position of the vehicle. References to positional data obtained from devices associated with vehicles, may be replaced by a reference to positional data obtained from a vehicle, and references to the movement of a device or devices may be replaced by a reference to the movement of a vehicle, and vice versa, if not explicitly mentioned. The device may be integrated with the vehicle, or may be a separate device associated with the vehicle such as a portable navigation apparatus. Of course, the positional data may be obtained from a combination of different devices, or a single type of device.

The positional data obtained from the plurality of devices is commonly known as "probe data". Data obtained from devices associated with vehicles may be referred to as vehicle probe data (or sometimes as floating car data).

References to "probe data" herein should therefore be understood as being interchangeable with the term "positional data", and the positional data may be referred to as probe data for brevity herein.

According to the present invention, estimates of one or more average penetration rate(s) for a region of a navigable network are determined. The region may generally correspond to a particular geographical area within the network, e.g. having a predetermined radius or size. Thus, the region will generally be associated with, i.e. or contain, a set of (plural) segments. In principle, a single average penetration rate may be determined for the region and used in turn for estimating traffic volume and/or traffic density for any segments within the region. However, at least in preferred embodiments, a plurality of average penetration rates are determined for the region and the most appropriate of these average penetration rates for any given segment may thus be selected for use in estimating the traffic volume and/or traffic density for that segment, e.g. based on the location of the segment within the region, and optionally based on various other factors (optionally including time).

For instance, preferably, the region may be divided (or subdivided) into a plurality of smaller areas (or groups of segments) and a respective average penetration rate determined for each area (or group). In this case, the most appropriate average penetration rate for a given segment within the region may be selected from the respective average penetration rates depending on the location of the segment within the region, i.e. depending on which area (group) that segment is located within. In this way, the variation in penetration rate throughout the network can be captured by an appropriate selection of the average penetration rate for a given segment.

For instance, it will be appreciated that the penetration rate will typically vary as a function of location throughout the network. Thus, in embodiments, the network, or the region of the network, may be divided, or subdivided, into a number of discrete geographical areas, each area including a group of segments, and an estimate of the average penetration rate (or even a plurality of average penetration rates) for each group of segments may be determined. A "group" of segments may thus generally comprise a set of plural segments that may be expected (or are assumed) to share similar penetration rates, i.e. so that they can reasonably be described by a common average penetration rate. For example, a group may suitably, and preferably does, include a set of segments falling within a predetermined geographic area, e.g. having a predetermined radius or size, within the network. At least some of the segments within a group may therefore be (directly) connected or adjacent to each other within the network. In general, a group may contain any (plural) number of segments as desired. For instance, the size of the group (either in terms of the number of segments and/or the geographical area associated with the group) may generally be selected as desired depending on the application, e.g. depending on the desired spatial resolution and/or the amount of probe data available. Preferably all of the segments within the region are allocated a respective group (so that an appropriate average penetration rate can be allocated to each segment based on the grouping). However, in some cases, less than all of the segments are allocated a group.

Thus, preferably, the present invention involves determining, using positional data relating to one or more congested segments within a group of segments within the region of the navigable network, one or more average penetration rate(s) for the segments within the group; determining a sample volume for a non-congested segment within the group based on the obtained positional data for that segment; and using the determined sample volume and the, or a selected one of the, average penetration rate(s) for the group, to estimate a traffic volume and/or traffic density for the non-congested segment. Preferably, the traffic volume and/or traffic density is estimated for multiple (or all) segments within a group. Furthermore, preferably, estimates of the average penetration rates for a plurality of different groups of segments within the region are determined, and traffic volumes and/or traffic densities are estimated for one or more (and preferably a plurality of) segments within each group. In this way, an estimate of the distribution of penetration rate throughout the region can be provided, and the traffic volume and/or traffic density throughout the region can be estimated.

The invention may therefore further comprise a step of grouping a plurality of segments together to define one or more groups of segments. The different groups of segments may suitably be defined using historic data, e.g. so that segments that have historically shown similar behaviour are grouped together. However, the groups may also be defined e.g. using a priori knowledge, e.g. of geographic location, road class, etc. The set of segments within a group may be dynamic. For instance, if it is determined over time that the behaviour of a particular segment within a group is closer to that of the segments within a different group than the initial group to which it was assigned, the segment may be moved into the different group.

The grouping may be based (solely) on geographical location, e.g. such that any segments falling within the geographical area associated with the group are assumed to have the average penetration rate, e.g. for the purposes of estimating traffic volume and/or traffic density. However, it will be appreciated that the penetration rate may also be expected to vary as a function of various other features such as road class, proximity to a certain type of landmark, whether the location is an urban or non-urban location, regional administration levels, traffic direction, etc. Thus, in embodiments, the segments within a group may additionally share one or more other attributes such as road class, etc. The grouping may therefore also account for this so that the segments within a group are generally located within the same geographic area and also have one or more further attributes (such as road class, etc.) in common.

A single average penetration rate may be determined for each group of segments (or for each region or area of the navigable network). This may then be used to estimate traffic volume and/or traffic density for segments within the group. However, it will be appreciated that the penetration rate may also generally vary as a function of time. For example, it might be expected that the penetration rate during night time conditions may be significant different e.g. as compared to the penetration rate at rush hour. Thus, in embodiments, the averaging model may also separate the positional data for a region into different time slots so that multiple average penetration rates associated with different respective time periods can be determined for the or each region, or preferably for each group. That is, in embodiments, the invention may further comprise determining a plurality of average penetration rates for the region, or for a (or each) group of segments within the region, with the plurality of average penetration rates being associated with a respective plurality of different time periods. For example, a time period may correspond to a certain time slot within the day (e.g. morning rush hour, afternoon, evening rush hour, night time) and/or a certain day (e.g. weekday or weekend), etc. The selection of the appropriate average penetration rate for a given segment may therefore also take into account the current time. For instance, and preferably, multiple average penetration rates may be determined for each group of segments with the multiple average penetration rates representing the average penetration rate for that group of segments at different respective time periods. That is, each average penetration rate may be associated with a certain geographical area (or group of segments) and also with a respective time period. The most appropriate average penetration rate for a given segment may thus be selected based both on the location of the segment and the current time.

It will be appreciated that the groups may themselves also be time-dependent. That is, the traffic behaviour for a segment may vary over time, and this may be reflected in the groupings. So, which segments are associated with which group may depend on the time period.

The average penetration rate(s) for a region may be estimated, at least in part, using the penetration rates as determined for one or more congested segments within the region. It will be understood that a "congested" segment is one wherein the traffic conditions are such that all vehicles on the segment can be assumed to travel at a substantially constant (reduced) collective speed. For example, a typical situation where this would apply would be a traffic jam, wherein the traffic regularly stops and starts. However, there are various other situations wherein traffic may be prevented from traversing the segment at the free-flow speed. For instance, other examples where congested conditions may apply would be where events such as a high traffic density, or road works, etc., are causing vehicles to travel at a substantially constant and reduced collective speed but it is not yet stop-start traffic. In embodiments, the invention may therefore comprise a further step of identifying one or more congested segments within the navigable network. Various suitable techniques can be used to identify a segment as being congested, as desired. For instance, a segment may preferably be identified as being congested based on positional data relating to the movement of devices along that segment, i.e. based on the travel speeds of devices moving along that segment. For instance, where it is determined that one or more, or preferably multiple, devices are travelling along a segment at a substantially common speed that is generally lower than would be expected in normal traffic conditions (i.e. lower than a threshold or free-flow speed), this may, and preferably is used to, indicate that the segment is congested. However, various other arrangements are possible. For instance, rather than identifying segments as being congested using the obtained positional (probe) data, supplemental data may be provided that indicates which segments are congested.

A penetration rate for a congested segment can be determined using the obtained positional data relating to devices travelling along that segment. In particular, the penetration rate for a congested segment can be determined from the observed collective speed of devices travelling along that segment. For instance, using a known relationship between traffic volume and density for congested conditions it is possible to estimate the traffic volume for a congested segment from the observed collective speed of devices travelling along that segment. The observed collective speed for the segment can be obtained from the positional data for one or more (and preferably a plurality of) devices travelling along that segment, e.g. by considering the change in position of the devices over time. From the determined traffic volume, along with the number of probe counts within a given time interval (i.e. the "sample volume"), the penetration rate for the congested segment can thus be estimated. This can then be repeated for plural, and preferably for all, congested segments within a region of the network, e.g. in order to determine an estimate of one or more "average" penetration rates for the region.

That is, an estimate of one or more average penetration rates for a region may be determined, at least in part, by suitably processing, e.g. averaging, the determined penetration rates for one or more (and preferably a plurality of) congested segments within the region (which may also be appropriately separated according to time slot, or any other desired attributes, as discussed above). For example, as discussed above, one or more average penetration rate(s) may be determined for each of a plurality of groups of segments within the region. This may be performed by averaging, or otherwise processing, all of the available penetration rate information for the group (optionally within a certain time period). For instance, the determined penetration rates for the different segments in the group may be averaged to give the average penetration rate for the group. The average may be suitably weighted. For instance, more recent, or live data, may be given a higher weighting than historic data. In general, the averaging model may be continuously updating in order to consider the latest observations while aiming at a smooth and slowly varying behaviour of the average penetration rate for each group. The averaging model may also take into account various other influencing factors, including, for example, the direction of traffic, the network hierarchy, the road type, etc.

Preferably, one or more direct measurements of traffic volume and/or traffic density are also used in determining an estimate of one or more penetration rate(s) for the region. For instance, preferably, the determination of the average penetration rate also uses direct measurements of the traffic volume (or density), e.g. as may be provided using traditional counting methods (whether manually or preferably automatically), i.e. "detector data", where available, to supplement or calibrate the estimates of the average penetration rate made using the probe data for the congested segments. For instance, such detector data, where available, allows a direct determination of the traffic volume to be made, which may thus serve as ground truth for validating the estimates of the average penetration rates and/or for determining values for one or more parameters for use in the estimation or averaging steps described above. However, typically, this information may only be detected for relatively few segments within the road network. Indeed, an advantage of the present invention is that the penetration rate for a plurality of segments (i.e. a group) can be estimated using probe data which naturally offers a wider coverage of the network. Where such detector data is not available, a calibration may be performed, where necessary, using e.g. historic or predicted data.

Once estimates of one or more average penetration rates for the region have been determined, e.g. as described above, the average penetration rates may then be used to estimate traffic volume and/or traffic density for other, non-congested segments within the region. For instance, for any segment within the region, a sample volume (or partial volume) may be determined from the positional data for that segment, and the sample volume may then be scaled using an appropriately selected average penetration rate for that segment in order to estimate the total traffic volume and/or traffic density. The "sample volume" is generally indicative of the number of probe counts either within a certain time interval (for determining traffic volumes) or length interval (for determining traffic densities). The sample volume thus represents a partial volume (or flow), corresponding to the percentage of the vehicles that are providing probe data. Thus, the sample volume for a segment may be obtained from the probe counts for the segment, i.e. by aggregating the number of probe counts within a selected time/length interval.

As described above, the appropriate penetration rate for a particular segment may generally be selected based on the location of the segment, as well as optionally the time period and any other possible influencing features such as road class. In particular, where an average penetration level is determined for a certain group of segments, it is assumed that all of the segments within the group share the same average penetration rate (and indeed the groupings are made on this basis), and so the (most) appropriate average penetration rate for any given segment may be selected as being the average penetration rate associated with the group containing that segment.

Thus, for any of the segments within a group, a sample volume (or probe count) for the segment may be determined based on the obtained positional data and used in combination with the penetration rate for the group in order to estimate a total traffic volume and/or traffic density for that segment. In particular, in this way, it will be appreciated that a traffic volume and/or traffic density for any segments within the group, including e.g. any non-congested segments, can be estimated using the sample probe count for those segments and the appropriate average penetration rate. It will be understood that a "non-congested" segment is generally a segment having free flow traffic conditions, i.e. wherein vehicles have a free choice of speed, and are not constrained to travel to a substantially constant common speed (as would be the case for congested segments) and for which it would not normally be possible to estimate traffic volume and/or density from probe data.

The sample volume, along with the selected average penetration rate, may be used to estimate either (or both) of a traffic volume or traffic density for a segment (or preferably for multiple segments) within the region. Traffic volume and traffic density are both important parameters for characterising the state of the traffic in the network and may be used for a variety of traffic planning and control applications.

For instance, traffic volume is a measure of the number of vehicles passing through a given cross section of a roadway in a specified period of time. So, to estimate traffic volume for a segment, the number of probe counts within a selected time interval (i.e. the "sample volume") can be determined, and the determined sample volume can then be scaled using an appropriately selected average penetration rate to estimate the total traffic volume for that segment. Typically, traffic volumes are reported in vehicles per hour (or even vehicles per hour per lane for multi-lane roadways). However, the size of the aggregation time interval may generally be selected as desired, e.g. depending on the application. For instance, for dynamic traffic phenomena such as traffic jams, where it may be desirable to report traffic volumes over relatively short intervals, the sample volumes may be aggregated over periods from about 1 minute up to about 1 hour. In other cases, such as for calibration of traffic light signals, or traffic planning, it may be desired to report traffic volumes over longer intervals. Naturally there may be a trade-off between time resolution and statistical error. For instance, in general, the longer the aggregation time interval, the higher the sample count and the lower the statistical counting error. Because the traffic volume is an estimated quantity, the relative error is also relevant for its interpretation and use. According to the present invention it is also possible to quantify the relative statistical error in the estimated traffic volume. In particular, an estimate of the relative statistical error in the estimated traffic volume may be provided from estimating the counting error associated with the sample volume. Thus, in embodiments, the relative error associated with the traffic volume may be determined and preferably provided as output along with the traffic volume (for storage and/or display to a user).

Traffic density is a measure of the number of vehicles per length interval. Thus, while the traffic volume can be estimated by aggregating probe counts over a certain time interval, the traffic density can be estimated by aggregating probe counts over a selected length interval to determine a sample volume, and then scaling the determining sample volume using an appropriately selected average penetration rate. The traffic density may also be reported as the specific traffic density, i.e. the number of vehicles per length interval per lane. The size of the length interval used for the spatial aggregation may generally be selected as desired, e.g. depending on the desired spatial resolution and accuracy. For instance, typical values for traffic density may vary between 0 (road is empty) and about 100 vehicles per kilometre per lane, while the maximum density is given by the inverse vehicle length (with an additional minimum bumper to bumper distance). Again, the relative error associated with the estimated traffic density may be determined and preferably reported along with the traffic density.

Thus, the present invention allows estimates of traffic volume and/or traffic density to be made for any segments within the network for which a suitable average penetration rate may be selected, even where a determination would not otherwise be possible, e.g. for non-congested segments. That is, so long as there is sufficient probe data, it is possible to reliably estimate traffic volume and/or traffic density over a relatively wider area of the network, and at lower cost, than typically would be possible with traditional methods. For instance, and preferably, a traffic volume and/or traffic density may be determined for a plurality (or all) of the segments within the region so that a picture of the traffic volume/density distribution throughout the region may be provided.

In preferred embodiments, the invention comprises storing and/or displaying the traffic volume and/or traffic density data to a user. That is, the traffic volume and/or traffic density data may be provided as output to a user.

It will be appreciated that the methods in accordance with the present invention may be implemented at least partially using software. It will thus be seen that, when viewed from further aspects and in further embodiments, the present invention extends to a computer program product comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described, by way of example only, with reference to the accompanying drawings, in which:

FIG. 2 is a flow chart illustrating the steps of an exemplary method for estimating the penetration rate for a segment from the observed collective speed in congested conditions that may be used in embodiments of the present invention; and FIG. 3 is a flow chart illustrating the steps of an exemplary method for generating traffic volume data in accordance with embodiments of the invention.

DETAILED DESCRIPTION

Figure 1:
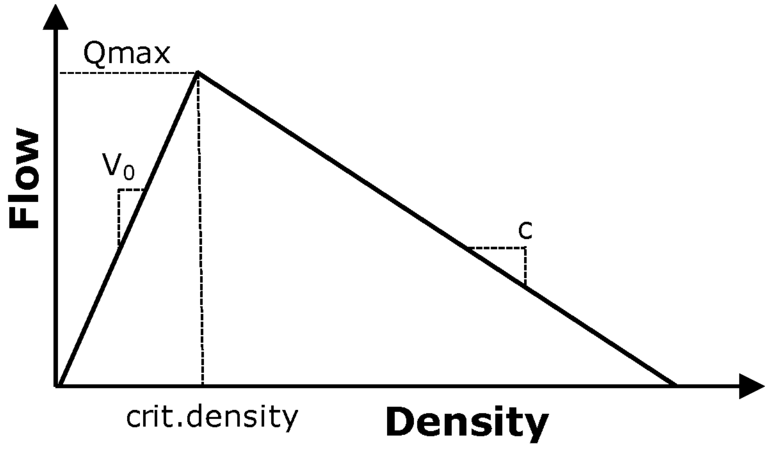
FIG. 1 is a diagram representing the fundamental relationship between traffic density and traffic volume for free and congested traffic conditions.

The present invention is, in preferred embodiments at least, directed to methods of generating data indicative of traffic volume and/or traffic density within a navigable network. Accurate generation of such traffic data is important for many traffic management and control applications. The present invention thus provides an improved method for generating such traffic data. In particular, the present invention provides methods for generating such traffic data from probe data. A preferred embodiment will now be described with regard to estimating traffic volumes.

The traffic volume (also referred to as traffic flow) is defined as the number of vehicles ΔN passing through a cross-section at a location x within a time interval Δt. That is, the traffic volume is generally given by (Equation 1):

$$Q=\Delta N/\Delta t$$

The time interval Δt may generally be set or selected as desired depending on the application and e.g. the required time resolution (and accuracy). For instance, in the context of dynamic traffic phenomena such as traffic jams typical time aggregation intervals Δt may suitably range from between about 1 minute to 1 hour. However, for other applications, such as calibration of traffic lights, traffic planning, etc., much larger time intervals may need to be considered, e.g. days, weeks or even months.

Traffic volumes cannot normally be measured directly from probe data as only a fraction of the total vehicles on the road network are reporting data. That is, the probe data represents only a certain sample of the total traffic within the road network. Although the percentage of probes is generally increasing, at present, the coverage (or "penetration rate") is typically only about 10% (e.g. in Germany or the Netherlands), and even less in some areas. (On the other hand, it is known that traffic speeds can be observed very well even from a relatively small sample of probes, especially in over-saturated or "congested" traffic conditions in which the driving speed cannot be chosen freely but is limited to a collective speed, e.g. a traffic jam.) Thus, traditionally, traffic volumes are determined using external traffic volume detectors such as video sensors, radar sensors, or inductive loop sensors employed within the road network. However, this approach is naturally limited to the relatively few locations where such external traffic volume detectors are provided.

Embodiments of the present invention thus provide improved methods wherein traffic volumes can be estimated using probe data from a sample of floating vehicles. The basic idea underlying this concept is that given the penetration rate (at a particular time, location, etc.), the observed probe count within a given time interval can be projected or extrapolated to give the total traffic volume. For example, if the penetration rate θ=0.1 (10%), and 20 probes have been observed at a particular location within the road network in a period of 10 minutes, the total traffic volume at that location may be projected to be, Q=20/0.1=200 vehicles/10 minutes=1200 vehicles/hour.

That is, in embodiments of the present invention, the total traffic volume Q is estimated from the observed probe sample count, n, during a particular aggregation interval Δt. For instance, with a sample volume (Equation 2):

$$v=\frac{n}{\Delta t}$$

and a penetration rate θ, the total traffic volume is then given by (Equation 3):

$$Q_{\Delta t}(x,t,\text{ other features})=\frac{v(x,t)}{\theta(x,t,\text{ other features})}=\frac{n}{\theta\Delta t}.$$

Note that the sample volume v is simply given by the count n of the observed probes at a location x and current time t over a certain aggregation interval Δt (in the past). The whole 'intelligence' of the estimation is therefore captured in the appropriate choice of penetration rate θ. Thus, in order to estimate traffic volumes for a given segment, it is necessary to determine (and select) an appropriate penetration rate θ for that segment in order to reach the best possible accuracy with respect to location, current time, and possibly other features such as road category, whether the segment is in an urban or non-urban location, regional administration levels, the direction of traffic, and/or any other potential influencing factors (such as the type of vehicles providing probe data, e.g. business fleets, which may be overrepresented at night but underrepresented at weekends).

Where available, traffic volumes from external detector data may be used to determine the penetration rate directly. For instance, such detectors directly measure the traffic volume (or flow) and therefore serve as ground truth from which the penetration rate can be estimated by comparing the traffic volume to the sample probe count, v, over the same time aggregation interval Δt, i.e. (Equation 4):

$$\theta(x,t)=\frac{v(\Delta t)}{Q(x,t,\Delta t)}$$

However, naturally, this is limited to the relatively few locations where such detector data is provided.

Thus, in embodiments, a model-based approach is used for estimating the penetration rate θ at least for congested segments. For instance, using a known relationship (often referred to as the "fundamental diagram", and illustrated in FIG. 1) between traffic volume and traffic density in homogenous traffic, it is possible to estimate the total traffic volume for a segment in congested conditions from the observed collective speed for that segment. The advantage here is that a penetration rate θ can be estimated for any congested segments within the network, which therefore offers the basis for a good spatial coverage and a large statistical base for averaging. Naturally, the model may make some simplifying assumptions, but the parameters of the model may be calibrated if necessary. For example, the ground truth detector data, where available, may suitably be used to calibrate (and validate) the model-based approach.

The starting point for this model-based approach is the fundamental hydrodynamic relation (flow equals density times speed). The function for relating these quantities within a road network is called the fundamental diagram and describes the theoretical relationship between density and flow in homogenous traffic, i.e. a steady-state equilibrium of identical drivers. A simple model for the fundamental diagram is given by a linear relationship as shown in FIG. 1. As shown, in both congested and non-congested conditions the relationship between density ρ and flow Q is linear, and can be formulated as (Equation 5):

$$Q(\rho) = \begin{cases} V_0\rho & \text{if } \rho \le \frac{Q_{max}}{V_0} \text{ (free flow)} \\ Q_{max}\left[1 - \frac{c}{V_0}\right] + c\rho & \text{if } \rho > \frac{Q_{max}}{V_0} \text{ (congested)} \end{cases}.$$

The branch for congested traffic in Equation 5 can be reformulated as a function of the average speed, V, using the hydrodynamic relation (Q=ρV) to give (Equation 6):

$$Q(V) = \frac{lQ_{max}\left(1 - \frac{c}{V_0}\right)}{1 - \frac{c}{V}}$$

with the following parameters:

- The average (collective) speed, V (given by the line through the origin in FIG. 1). The average speed V can be well measured by individual probes, particularly in congested traffic conditions in which the free choice of driving speed is not possible so that all vehicles travel at substantially the same average speed;
- The effective capacity $Q_{max}$ of the road (per lane, with l being the number of lanes). Typical values are in the range of about 1500-2000 vehicles per hour; and
- The propagation velocity c representing the speed at which perturbations propagate through congested traffic. The quantity is typically constant with values within the range of about −15+/−3 kilometres per hour. (Note that the propagation velocity c is the speed at which downstream jam waves travel against the direction of travel, hence the minus sign).

Thus, the basic idea is to relate the average speed V, which is (as an intensive quantity) measurable from the probe data to the traffic volume Q that is (as an extensive quantity) not observable from probe measurements. This approach is only possible for congested traffic conditions, but these conditions can readily be identified by means of the probe data too (e.g. where it is determined that all of the vehicles are travelling at a substantially constant and reduced collective speed relative to the expected free flow speed).

The parameters c and $Q_{max}$ generally need to be determined, or calibrated. This calibration can be performed using detector data, where available, or may alternatively (or additionally) be performed using historical or theoretical data.

FIG. 2 is a flow chart illustrating the steps of an exemplary method for estimating the penetration rate for a congested segment. Although not shown in FIG. 2, it will be appreciated that the method may also include a prior step of identifying whether or not the segment is congested, e.g. using probe data (or otherwise). For any segments identified as congested, the collective or average speed for that segment is determined (step 201). For instance, this may be done by observing the speeds of multiple vehicles travelling along the segments and averaging these to give an estimate of the collective speed. From the observed collective or average speed, the traffic volume Q can then be estimated using Equation 6 (step 202). Finally, by applying Equation 4, the number of probe counts can be related to the determined traffic volume Q in order to estimate a penetration rate θ for the segment (step 203).

Thus, the traffic volume and penetration rate may be determined for a congested segment (e.g. a traffic jam) based on the detected speeds of probe vehicles travelling along the segment. This method can be repeated for multiple (and preferably all) congested segments within a certain region or geographical area (and potentially having other parameters in common such as road class, etc.) and the multiple penetration rates then used to determine an estimate of one or more average penetration rates for the region or area. Once one or more average penetration rates have been determined, these can then be used to estimate a traffic volume for other segments within the same region or area. For instance, for other, e.g. non-congested, segments, the traffic volume may be estimated from the detected sample volume for those segments by scaling the detected sample volume by an appropriate average penetration rate for that segment.

FIG. 3 is a flow chart illustrating the general steps of an exemplary method for generating traffic volume data in accordance with an embodiment of the invention. At step 301, positional data relating to the movement of a plurality of vehicles within a region of a network (i.e. probe data) is obtained. This probe data is then used, optionally along with any data from external traffic volume detectors, at step 302, to estimate the penetration rates for one or more segments within the region. For instance, where external traffic volume detector data is available for a segment, this can be used to determine directly the penetration rate for that segment. On the other hand, where such detector data is not available, the penetration rates for congested segments may be estimated using a model-based approach, as described above in relation to FIG. 2. Typically, this step is performed for multiple congested segments within the region to determine estimates of multiple penetration rates within the region. These can then be used to determine one or more average penetration rates for the region. Thus, at step 303, an estimate of one or more average penetration rates for a group of segments within the region, e.g. a group of segments falling within a certain geographical area (and potentially having other parameters such as road class in common), may be determined. Preferably, the region is divided into a plurality of groups of segments, and one or more average penetration rates may be determined for each group of segments. The average penetration rates for the respective groups may thus represent the variation of the penetration rate as a function of location within the region. In some cases, multiple average penetration rates may be determined for each group of segments, e.g. representing the variation in the penetration rate for the group as a function of time. For instance, for each group, a plurality of average penetration rates may be determined with each average penetration rate representing the penetration rate for a respective time period. In general, the averaging model may thus separate in time slots, as well as regions, and may be continuously updating in order to consider the latest observations while aiming for a smooth and slowly varying behaviour of the average penetration rate. The averaging model may also take into account various other influencing parameters including, e.g., the direction of traffic, the network hierarchy, the road class, etc. In principle, these parameters could also be estimated by means of machine learning.

The average penetration rate for a group can then be applied to any segments within the group. For instance, at step 304, a determination of a sample volume for one or more (e.g.) non-congested segments within the group may be made by detecting (counting) the number of sample probes within a selected time interval. At step 305, the determined sample volume for the one or more non-congested segments can then be used, in combination with the appropriate average penetration rate for that segment, to estimate the traffic volume, e.g. using Equation 3.

Since the traffic volume Q is an estimated quantity, the (relative) error may also be relevant for its interpretation and use. It is known from basic error propagation for uncorrelated errors that the relative error δQ is given by the sum of the relative errors of n (the sample probe count) and θ (the average penetration rate). The error in θ generally results from the statistics of the estimation process, as described above. However, the counting statistics of the number probe vehicles, n, can be well approximated by a Poisson distribution, with the parameter p estimated by the number of probe counts n in the observation interval Δt. For a Poisson distributed variable, the expectation value and the variance are given by p, so that the relative error is $\delta n=1/\sqrt{\mu}=1/\sqrt{n}$, and, therefore (Equation 7):

$$\delta n = \frac{1}{\sqrt{v\Delta t}}$$

Table 1 illustrates the relative error for various different scenarios parameterized by different penetration rates θ and aggregation intervals Δt for various total traffic volume scenarios. As shown, the accuracy of the volume estimation generally increases with a higher number of probe observations (although of course the sampling percentage (penetration rate) cannot generally be controlled). The error also decreases when larger aggregation intervals are used, albeit at the cost of a worse time resolution. Also, the relative accuracy may depend strongly on the traffic situation. For instance, good accuracy can be provided on a multi-lane highway during peak hours while during night-time accuracy may be limited even with higher aggregation intervals.

TABLE 1

Estimated relative error (%) as a function of penetration rate (sampling percentage, θ), time aggregation interval Δt and traffic volume.

| Sampling | Time Aggr. | Volume (vehicles/hour) | | | | | |
|---|---|---|---|---|---|---|---|
| θ | Δt | 100 | 500 | 1000 | 2000 | 3000 | 5000 |
| 5% | 15 min | 89% | 40% | 28% | 20% | 16% | 13% |
| 5% | 30 min | 63% | 28% | 20% | 14% | 12% | 9% |
| 5% | 30 min | 45% | 20% | 14% | 10% | 8% | 6% |
| 10% | 15 min | 63% | 28% | 20% | 14% | 12% | 9% |
| 10% | 30 min | 45% | 20% | 14% | 10% | 8% | 6% |
| 10% | 60 min | 32% | 14% | 10% | 7% | 6% | 4% |
| 25% | 15 min | 40% | 18% | 13% | 9% | 7% | 6% |
| 25% | 30 min | 28% | 13% | 9% | 6% | 5% | 4% |
| 25% | 60 min | 20% | 9% | 6% | 4% | 4% | 3% |

So, from the input (i.e. the number of probe observations in a time interval Δt and the appropriate average penetration rate θ), the following quantities may be provided as output in a traffic service:

- total traffic volume Q;
- specific traffic volume per lane, $Q_s$=Q/l (for a road section with l lanes);
- the relative error of the volume estimate δQ, e.g. as determined from Equation 7, optionally as well as the estimated error for the penetration rate θ; and
- the aggregation interval Δt defining the measurement interval of probe observations.

The aggregation interval Δt can generally be selected as desired, e.g. depending on the user's requirements. For instance, it may be attractive to report flow estimates within relatively short time intervals (e.g. every 5 minutes). On the other hand, with longer aggregation intervals, the errors become smaller since more connected probe vehicles may be observed.

Although the exemplary methods described above have been presented in the context of determining traffic volume data, it will be appreciated that the present invention also extends to methods and systems for generating traffic density data. The traffic density is another important quantity for characterising the state of traffic within a region and is generally defined as the number of vehicles per length (and the specific traffic density is the number of vehicles per length and per lane). The traffic density can be projected from a sample of probe data in combination with the appropriate average penetration rate as scaling factor in a similar manner as described above. However, whilst the traffic volume values are estimated by means of aggregating probe data over a selected time interval, the traffic density is generally derived by aggregating probe data over a selected length interval, i.e. by averaging over space over all latest positions of the probe vehicles at a moment in time. This averaging helps to smooth out variations in space of the current probe vehicles as these are essentially randomly distributed. There may be a trade-off between a high spatial resolution of the traffic density over a stretch of road and ensuring a sufficiently smooth and continuous trend between neighbouring sections. The criterion for choosing the right length interval for aggregation may therefore depend on the number of probes covering the road section under considering. For instance, during rush hour conditions, with more cars on the road and therefore more connected probes, the spatial resolution can be chosen to be higher (i.e. by using a shorter length interval). On the other hand, a longer length interval may be required during times or for road sections with lighter traffic and fewer probe counts.

It will be appreciated that traffic volume and/or traffic density data may be useful in a variety of traffic management and control applications. In general, the use case may depend on the selected time or length interval. For instance, traffic volume estimation may be performed continuously, and many applications could therefore make use of the data by aggregating probe counts over time intervals of days or weeks. This may be particularly useful for determining travel demand patterns for calibration and validation of traffic light signal timings or for estimating road capacities (i.e. the maximum traffic volume possible on a road segment). For example, traffic light signal timings are normally calibrated only once based on a small data set. However, by averaging traffic volumes over a period of several months the typical demand patterns for a single day of the week can be determined based on a much larger sample. Also, a continuous monitoring for changes in the traffic demand would be possible.

The skilled person will appreciated that an apparatus provided to execute a method as described herein may comprise hardware, software, firmware or any combination of two or more of these.

The skilled person will appreciate that, whilst the term GPS data has been used to refer to positioning data derived from a GPS global positioning system. Other positioning data could be processed in a manner similar to the methods as described herein. Thus, term GPS data may be replaceable with the phrase positioning data. Such positioning data, could for example be derived from position data derived from mobile phone operation, data received at toll barriers, data obtained from induction loops embedded in roads, data obtained from number plate recognition system or any other suitable data.

All of the features disclosed in this specification, and/or all of the steps of any method or process so disclosed, may be combined in any combination, except combinations where at least some of such features and/or steps are mutually exclusive.

Each feature disclosed in this specification, may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification, or to any novel one, or any novel combination, of the steps of any method or process so disclosed. The claims should not be construed to cover merely the foregoing embodiments, but also any embodiments which fall within the scope of the claims.

The invention claimed is:

1. A method for generating traffic data indicative of traffic volume and/or traffic density within a navigable network in an area covered by an electronic map, the electronic map comprising a plurality of segments representing navigable elements of the navigable network, the method comprising:

obtaining positional data relating to the movement of a plurality of devices along the navigable elements represented by the segments of the electronic map;

determining an estimate of one or more average penetration rates for a region, wherein each of the one or more average penetration rates is determined by:

computing, using an average speed for at least one respective congested segment, a traffic volume for the at least one respective congested segment, wherein a congested segment is a segment having traffic conditions such that vehicles travel along the segment at a substantially constant and reduced collective speed relative to an expected free flow speed for the segment; and computing the average penetration rate as percentage of the traffic volume represented by devices from among the plurality of devices that traveled on the at least one respective congested segment;

determining, based on the obtained positional data, a sample volume for a non-congested segment within the region, wherein the sample volume is indicative of a number of the plurality of devices counted on the non-congested segment within a certain time or within a length interval of the non-congested segment; and estimating, using the determined sample volume and a selected one of the average penetration rates for the region, a traffic volume and/or traffic density for the non-congested segment.

2. A method as claimed in claim 1, comprising:

determining, using positional data relating to one or more congested segments within a group of segments within the region of the navigable network, one or more average penetration rates for the segments within the group;

determining a sample volume for a non-congested segment within the group based on the obtained positional data for that segment; and using the determined sample volume and the, or a selected one of the, average penetration rates for the group, to estimate a traffic volume and/or traffic density for the non-congested segment.

3. A method as claimed in claim 2, wherein the group of segments comprises a plurality of segments falling within a selected geographical area.

4. A method as claimed in claim 3, wherein the segments within the group of segments further share one or more attributes.

5. A method as claimed in claim 1, further comprising using one or more direct measurements of traffic volume and/or traffic density in determining an estimate of one or more average penetration rates for the region.

6. A method as claimed in claim 1, comprising determining a plurality of average penetration rates for the region, or for a group of segments within the region, each of the plurality of average penetration rates being associated with a respective time period.

7. A method as claimed in claim 1, further comprising determining a relative error associated with the estimated traffic volume and/or traffic density for output along with the estimated traffic volume and/or traffic density.

8. A method as claimed in claim 1, further comprising determining estimates of the average penetration rates for a plurality of different groups of segments within the region, and estimating traffic volumes and/or traffic densities for one or more segments within each group.

9. A method as claimed in claim 1, further comprising storing the estimated traffic volume and/or traffic density for subsequent display and/or comprising displaying the estimated traffic volume and/or traffic density to a user.

10. The method of claim 1, wherein each average penetration rate is a value representing a percentage of vehicles from which positional data is being or was collected.

11. A system comprising one or more processors and a memory, the one or more processors being arranged to generate traffic data indicative of traffic volume and/or traffic density within a navigable network in an area covered by an electronic map, the electronic map comprising a plurality of segments representing navigable elements of the navigable network, the one or more processors being configured to:

obtain positional data relating to the movement of a plurality of devices along the navigable elements represented by the segments of the electronic map;

determine an estimate of one or more average penetration rates for a region, wherein each of the one or more average penetration rates is determined by:

computing, using an average speed for at least one respective congested segment, a traffic volume for the at least one respective congested segment, wherein a congested segment is a segment having traffic conditions such that vehicles travel along the segment at a substantially constant and reduced collective speed relative to an expected free flow speed for the segment; and computing the average penetration rate as percentage of the traffic volume represented by devices from among the plurality of devices that traveled on the at least one respective congested segment;

determine, based on the obtained positional data, a sample volume for a non-congested segment within the region, wherein the sample volume is indicative of a number of the plurality of devices counted on the non-congested segment within a certain time or within a length interval of the non-congested segment; and estimate, using the determined sample volume and a selected one of the average penetration rates for the region, a traffic volume and/or traffic density for the non-congested segment.

12. The system of claim 11, wherein the one or more processors are further configured to:

determine, using positional data relating to one or more congested segments within a group of segments within the region of the navigable network, one or more average penetration rates for the segments within the group;

determine a sample volume for a non-congested segment within the group based on the obtained positional data for that segment; and use the determined sample volume and the, or a selected one of the, average penetration rates for the group, to estimate a traffic volume and/or traffic density for the non-congested segment.

13. The system of claim 12, wherein the group of segments comprises a plurality of segments falling within a selected geographical area.

14. The system of claim 13, wherein the segments within the group of segments further share one or more attributes.

15. The system of claim 11, wherein the one or more processors are further configured to:

use one or more direct measurements of traffic volume and/or traffic density in determining an estimate of one or more average penetration rates for the region.

16. The system of claim 11, wherein the one or more processors are further configured to:

determine a plurality of average penetration rates for the region, or for a group of segments within the region, each of the plurality of average penetration rates being associated with a respective time period.

17. The system of claim 11, wherein the one or more processors are further configured to:

determine a relative error associated with the estimated traffic volume and/or traffic density for output along with the estimated traffic volume and/or traffic density.

18. The system of claim 11, wherein the one or more processors are further configured to:

determine estimates of the average penetration rates for a plurality of different groups of segments within the region; and estimate traffic volumes and/or traffic densities for one or more segments within each group.

19. The system of claim 11, wherein the one or more processors are further configured to:

store the estimated traffic volume and/or traffic density for subsequent display and/or comprising displaying the estimated traffic volume and/or traffic density to a user.

20. A non-transitory computer readable medium, comprising instructions which, when executed by a computing device, cause the computing device to perform a method for generating traffic data indicative of traffic volume and/or traffic density within a navigable network in an area covered by an electronic map, the electronic map comprising a plurality of segments representing navigable elements of the navigable network, the method comprising:

obtaining positional data relating to the movement of a plurality of devices along the navigable elements represented by the segments of the electronic map;

determining an estimate of one or more average penetration rates for a region, wherein each of the one or more average penetration rates is determined by:

computing, using an average speed for at least one respective congested segment, a traffic volume for the at least one respective congested segment, wherein a congested segment is a segment having traffic conditions such that vehicles travel along the segment at a substantially constant and reduced collective speed relative to an expected free flow speed for the segment; and computing the average penetration rate as percentage of the traffic volume represented by devices from among the plurality of devices that traveled on the at least one respective congested segment;

determining, based on the obtained positional data, a sample volume for a non-congested segment within the region, wherein the sample volume is indicative of a number of the plurality of devices counted on the non-congested segment within a certain time or within a length interval of the non-congested segment; and estimating, using the determined sample volume and a selected one of the average penetration rates for the region, a traffic volume and/or traffic density for the non-congested segment.

* * * * *